(12) United States Patent
Latos

(10) Patent No.: US 9,732,895 B1
(45) Date of Patent: Aug. 15, 2017

(54) VALVE FITTING MILLING SYSTEM AND METHOD FOR TRANSMISSION PIPES

(71) Applicant: Jerome Latos, Tinley Park, IL (US)

(72) Inventor: Jerome Latos, Tinley Park, IL (US)

( * ) Notice: Subject to any disclaimer, the term of this patent is extended or adjusted under 35 U.S.C. 154(b) by 362 days.

(21) Appl. No.: 14/331,828

(22) Filed: Jul. 15, 2014

Related U.S. Application Data

(63) Continuation of application No. 14/161,543, filed on Jan. 22, 2014, now abandoned.

(60) Provisional application No. 61/755,189, filed on Jan. 22, 2013.

(51) Int. Cl.
*F16L 41/04* (2006.01)

(52) U.S. Cl.
CPC ................... *F16L 41/04* (2013.01)

(58) Field of Classification Search
CPC ................... F16L 41/04; F16L 41/06
USPC ............ 137/15.12, 15.13, 315.41, 315.42, 137/317–320, 322
See application file for complete search history.

(56) References Cited

U.S. PATENT DOCUMENTS

| | | | | |
|---|---|---|---|---|
| 2,014,480 A * | 9/1935 | Martin, Jr. | ............... | F16K 5/222 137/246.18 |
| 3,669,139 A * | 6/1972 | Gajdos | ................... | F16L 41/04 137/317 |
| 3,948,282 A * | 4/1976 | Yano | ....................... | F16L 41/04 137/15.14 |
| 5,381,815 A * | 1/1995 | Okonek | .................. | F16K 43/00 137/15.13 |
| 5,660,199 A * | 8/1997 | Maichel | .................. | F16L 41/06 137/15.12 |
| 5,924,436 A * | 7/1999 | Kitani | ...................... | E03B 9/02 137/15.09 |
| 6,286,542 B1 * | 9/2001 | Morain | ...................... | E03F 3/06 137/317 |
| 6,810,903 B1 * | 11/2004 | Murphy | ................ | F16L 55/105 137/315.41 |
| 7,338,089 B2 * | 3/2008 | Lee | ........................ | F16L 41/084 137/15.09 |
| 7,753,068 B2 * | 7/2010 | Villar Colquell | ....... | F16L 41/06 137/15.14 |
| 7,909,064 B2 * | 3/2011 | Natili, Jr. | ............ | F15B 13/0817 137/884 |
| 2010/0107329 A1 * | 5/2010 | Nelson | ................ | A61G 7/1067 5/87.1 |

\* cited by examiner

*Primary Examiner* — John K Fristoe, Jr.
*Assistant Examiner* — Josephine Trinidad-Borges
(74) *Attorney, Agent, or Firm* — Cardinal Law Group

(57) ABSTRACT

Embodiments of the invention relate a valve fitting milling system and method for use with transmission pipes. One embodiment relates to a milling adaptor used with a valve housing having a temporary gate extending about the pipe and a mill. The milling adaptor includes a main adaptor plate removeably connected to the valve housing which defines at least one milling slot; a sliding gate cutting adaptor movably contacts the main adapted plate and defines at least one cutting hole; a cranking rod engages the sliding gate cutting adaptor and moves the sliding gate cutting adaptor with respect to the main adaptor plate; and a top retainer track removable connected to at least the main adaptor plate. The mill engages at least the sliding gate adaptor and mills a cross-cut hole in the pipe to receive a valve therein.

20 Claims, 18 Drawing Sheets

SECTION A-A

SECTION C-C

VALVE FITTING MILLING SYSTEM AND METHOD FOR TRANSMISSION PIPES

CLAIM FOR PRIORITY

This application is a continuation of U.S. patent application Ser. No. 14/161,543 filed Jan. 22, 2014 and titled "Temporary Valve Fitting Milling Techniques for Transmission Pipes" which claims the benefit under 35 U.S.C. §119(e) of U.S. Provisional Application No. 61/755,189 filed Jan. 22, 2013 and titled "Temporary Valve Fitting Milling Techniques for Transmission Pipes" the complete subject matter of which is incorporated herein by reference.

FIELD OF THE INVENTION

The invention relates to a valve fitting milling system and method for use with transmission pipes, including but not limited to water, gas, sewage pipes and the like. More specifically, embodiments relate to a milling system and method which mills the transmission pipe is a cross-cut fashion.

BACKGROUND OF THE INVENTION

The present embodiments relate generally to systems and methods for valve insertion and linestopping.

There are various instances in which it may become necessary or desirable to affect flow within an existing pipe, such as one that is subterraneously placed. Such pipes may carry gases, oil, water, or other fluids, and it may be desirable to temporarily or permanently stop the flow within the pipe.

Various valve insertion methods are known for inserting a valve in a line of an existing pipe. In general, a sealing housing having first and second portions may be coupled around an exterior surface of the existing pipe. A slit may be made in the existing pipe using a cutting machine without stopping passage of fluid. A gate, or sluice valve, is inserted into the slit portion of the existing pipe. The gate may be advanced to a position in which is inhibits flow through the existing pipe.

U.S. Pat. No. 6,622,747 B2 to Satos et al. and US Patent Application No. 2012/0222753 A1 to Satos et al. disclose devices for milling valve fittings in transmission pipes. However, in both the Satos patent and application, the mill is adapted to rotate about the transmission pipe. Such rotation about the transmission pipe makes it difficult to maintain an airtight seal about the transmission pipes, allowing leaks.

In various systems, a relatively large excavation is required in order to access the existing pipe and perform various operations. Moreover, the cutting machine generally either cuts an entire section of the pipe, or a section that is about 180 degrees along the upper surface of the pipe, prior to insertion of the gate. However, such large cuts to the pipe may adversely affect the integrity of the pipe.

Additionally, it may be difficult to attach a valve bonnet and a gate to the existing pipe after a cut is formed into the existing pipe. Still further, it also may be difficult or impossible to remove the valve bonnet and gate after a desired operation is performed. In some situations, a relatively expensive valve bonnet and gate therefore remain coupled to the existing pipe even in situations where it was only necessary to perform a relatively brief, single linestop.

Accordingly, it is an object of the present invention to provide a valve fitting milling system and method for use with transmission pipes, including but not limited to water, gas, sewage pipes and the like.

These and other objects will be readily evident upon a study of the specification and the accompanying drawings.

SUMMARY OF THE INVENTION

Embodiments of the invention relate to a milling adaptor for use with a valve housing having a temporary gate extending about a pipe and a mill. The milling adaptor includes a main adaptor plate adapted to be removeably connected to the valve housing, the main adaptor plate defining at least one milling slot; a sliding gate cutting adaptor adapted to movably contact the main adaptor plate, the sliding plate gate cutting adaptor defining at least one cutting hole; a cranking rod adapted to engage the sliding gate cutting adaptor and move the sliding gate cutting adapter with respect to the main adaptor plate; and a top retainer track adaptor to be removable connected to at least the main adaptor plate. The mill is adapted to engage at least the sliding gate adaptor and mill a cross-cut hole in the pipe to receive a valve therein.

Another embodiment relates to a system for milling a temporary valve in a pipe. The system includes a valve housing having a temporary gate extending about the outer circumference of the pipe along a longitudinal direction thereof. The valve housing includes a first valve portion surrounding a portion of an exterior surface of the pipe; and a second valve portion removably connected to the first valve portion and surrounding a portion of the exterior surface of the pipe. The system further includes a milling adaptor for use with the valve housing and a mill. The milling adaptor includes a main adaptor plate adapted to be removeably connected to the valve housing, the main adaptor plate defining at least one milling slot; a sliding gate cutting adaptor adapted to movably contact the main adaptor plate, the sliding gate cutting adaptor defining at least one cutting hole; a cranking rod adapted to engage the sliding gate cutting adaptor and the main adaptor plate, moving the sliding gate cutting adapter with respect to the main adaptor plate; and a top retainer track adaptor to be removable connected to at least the main adaptor plate; whereby a mill is adapted to engage at least the sliding gate cutting adaptor and mill a hole in the pipe to receive a valve therein.

Still another embodiment relates to a method for milling a transmission pipe. The method includes attaching a valve housing having a temporary gate to the transmission pipe extending about the outer circumference of the transmission pipe along a longitudinal axis the transmission pipe; attaching a milling adaptor used with a mill to at least the valve housing; attaching a mill to at least the milling adaptor; milling a cross cut hole in the transmission pipe in along an axis dissimilar to or different from the longitudinal axis of the transmission pipe; and closing the temporary gate.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF PRESENTLY PREFERRED EMBODIMENTS

Embodiments of the invention relate to a valve fitting milling system and method for use with transmission pipes, including but not limited to water, gas, sewage pipes and the like. More specifically, embodiments relate to a milling system and method which mill the transmission pipe is a cross-cut fashion (i.e., substantially perpendicular to the longitudinal axis of the transmission pipe).

Figure 1:
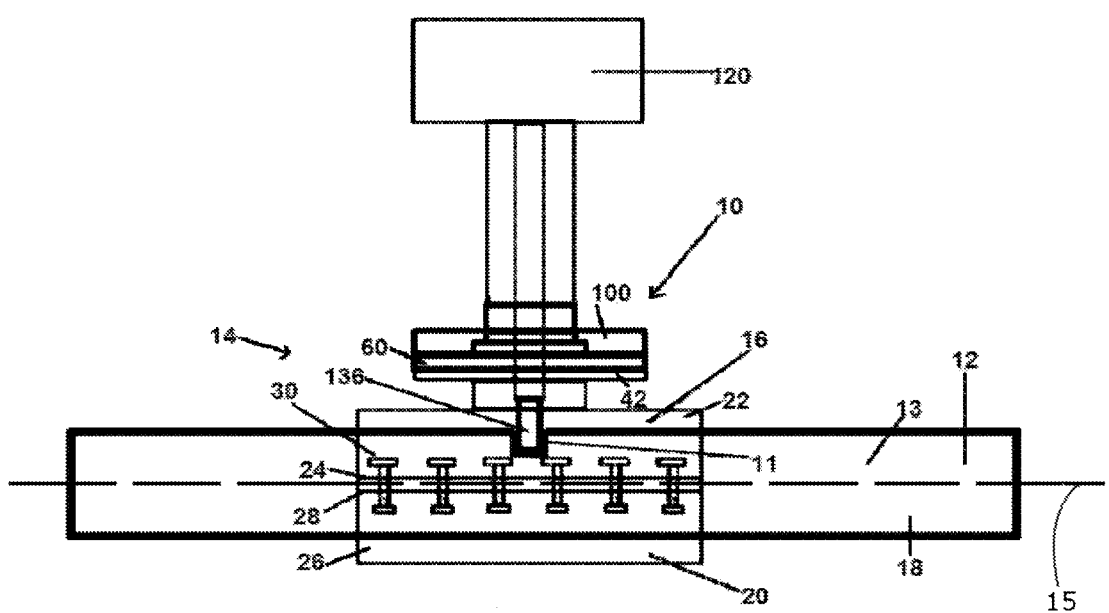
FIG. 1 is a side view of a valve fitting milling system in accordance with one embodiment of the present invention.
Figure 2:
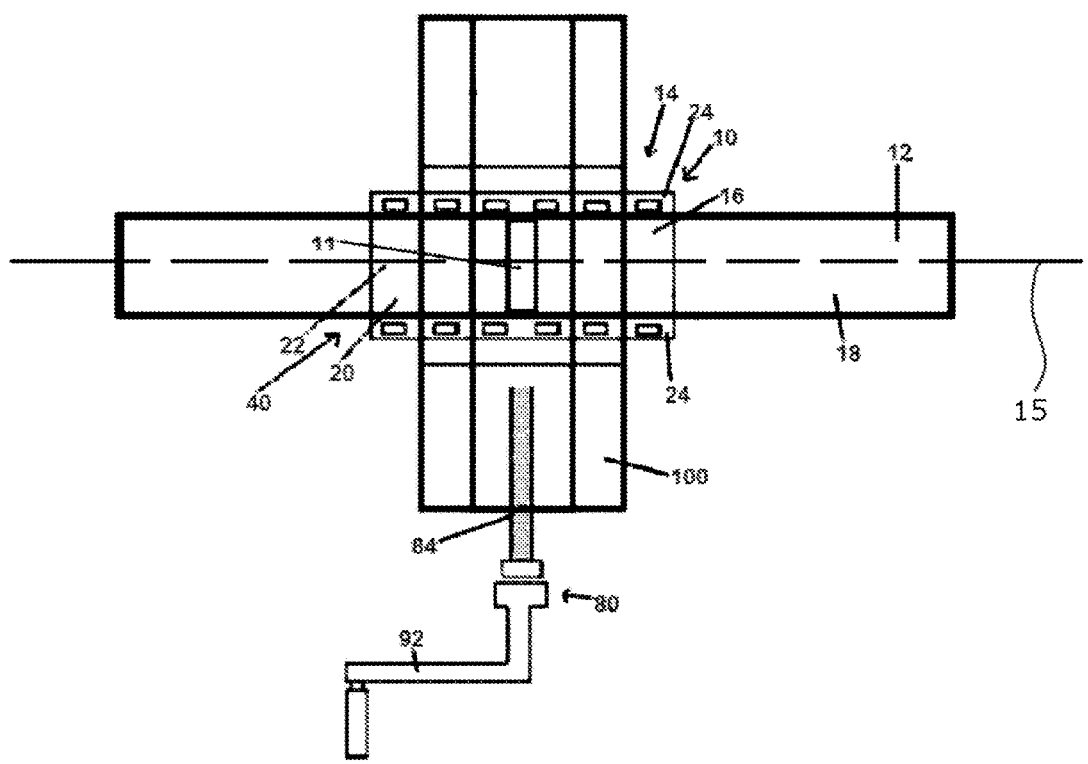
FIG. 2 is top view of the valve fitting milling system of FIG. 1 in accordance with one embodiment of the present invention.

Referring now to FIGS. 1-2, a first embodiment of a valve fitting milling system 10 having a temporary gate (not shown) for use with an existing pipe 12 is described. The system 10 includes a valve sealing housing 14, which includes a first or upper half valve portion 16 surrounding a portion of an exterior surface 18 of the pipe 12 and second or lower half valve portion 20 surrounding a portion of the exterior surface 18 of the pipe 12. The first and second valve portion 16 and 20 each partially surround the exterior surface of the pipe 12, and are designed and dimensioned to enclose and seal up, in an airtight state, two portions of the existing pipe 12 along its longitudinal or axial length of the pipe.

As depicted in FIGS. 1-2, the first valve portion 16 includes a main body 22 that is adapted to encircle a portion of the pipe 12 having a longitudinal axis 15, and coupling regions 24 that may extend radially outward relative to the pipe 12. Similarly, the second valve portion 20 comprises a main body 26 that is adapted to encircle a portion of the pipe 12, and coupling regions 28 that may extend radially outward relative to the pipe 12 and are designed such that coupling regions 24 overlays coupling regions 28. In at least one embodiment, the coupling regions 24 and 28 may comprise holes that are dimensioned to receive a securing member, such as a bolt forming part of nut and bolt assemblies 30. When assembled, the nut and bolt assembly 30 secures the coupling region 28 of the second valve portion 20 to the coupling region 24 of the first valve portion 16, thereby securing the first and second valve portions 16 and 20 of the system 10 circumferentially around the pipe 12.

One embodiment of the system and method includes a milling adaptor 40 for use with the valve housing 14 and a mill 120. In at least one embodiment, the milling adaptor 40 includes a main adaptor plate 42 adapted to be removeably connected to the valve housing 14, a sliding gate cutting adaptor 60, a cranking rod 80 and a top retainer track 100.

Figure 3:
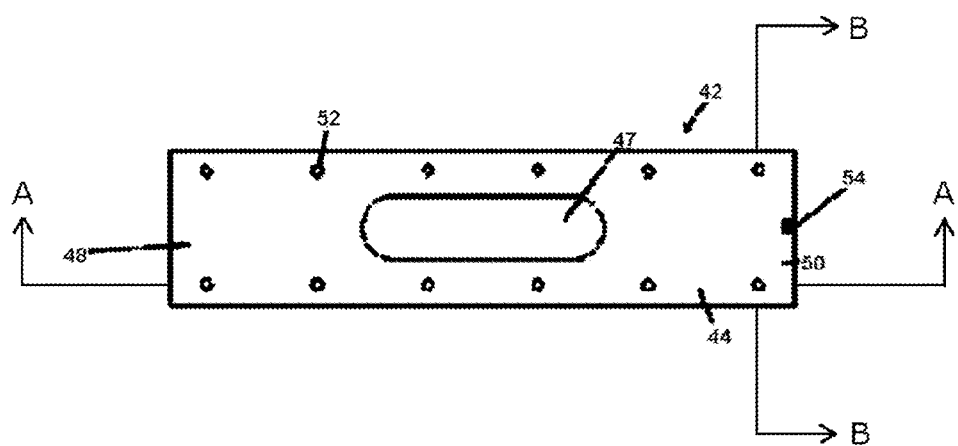
FIG. 3 is a top view of a main adaptor plate used with the valve fitting milling system of FIGS. 1-2 in accordance with one embodiment of the present invention.
Figure 4:
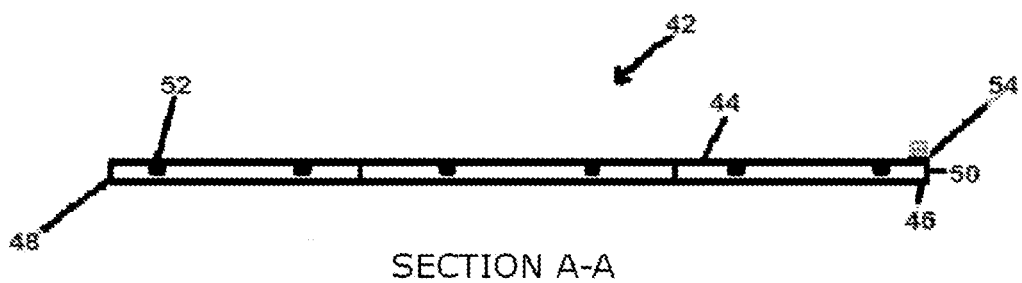
FIG. 4 is a side view of the main adaptor plate of FIG. 3 in accordance with one embodiment of the present invention.
Figure 5:
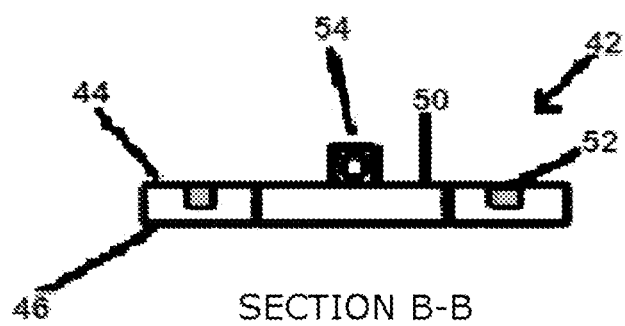
FIG. 5 is an end view of the main adaptor plate of FIG. 3 in accordance with one embodiment of the present invention.
Figure 6:
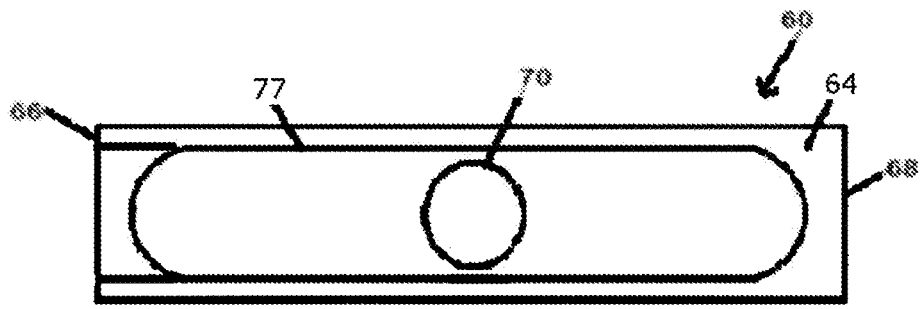
FIG. 6 is a top view of a horizontal sliding gate cutting adaptor with the valve fitting milling system of FIGS. 1-2 in accordance with one embodiment of the present invention.
Figure 7:
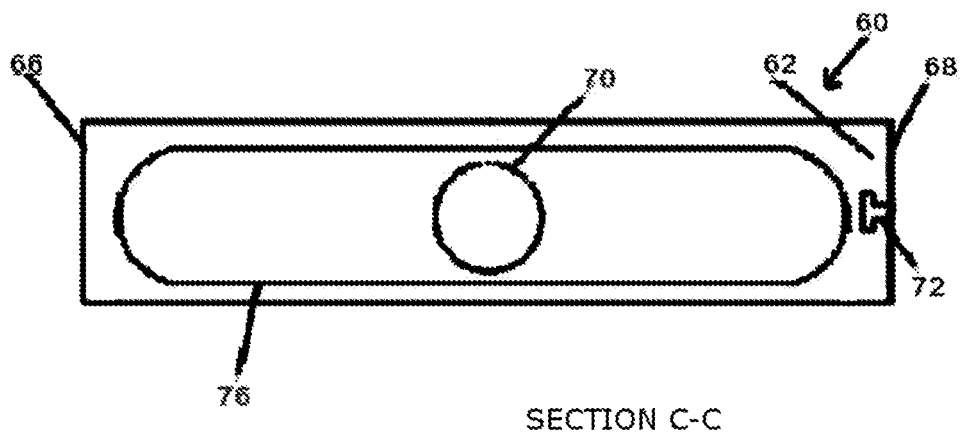
FIG. 7 is a bottom view of the horizontal sliding gate cutting adaptor of FIG. 6 in accordance with one embodiment of the present invention.
Figure 8:
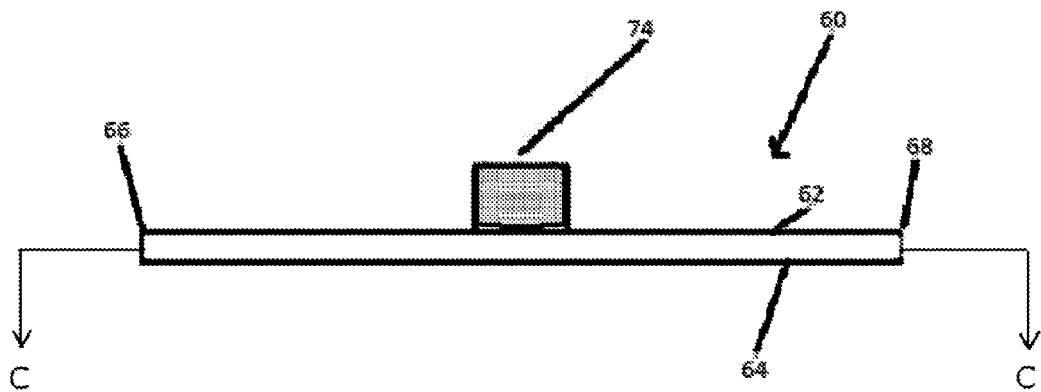
FIG. 8 is an side view of the horizontal sliding gate cutting adaptor of FIG. 6 in accordance with one embodiment of the present invention.
Figure 9:
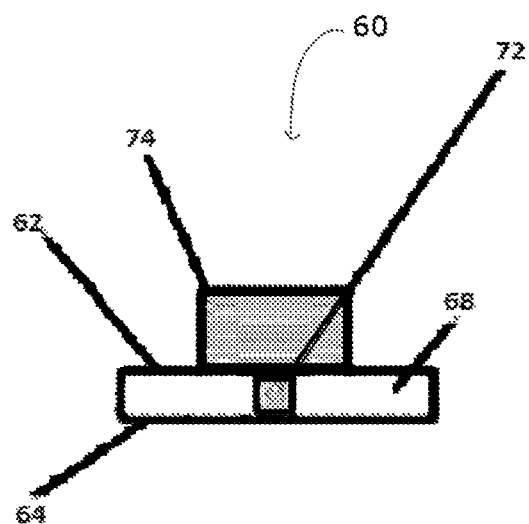
FIG. 9 is an end view of the horizontal sliding gate cutting adaptor of FIG. 6 in accordance with one embodiment of the present invention.

FIGS. 3-5 depict an embodiment of the main adaptor plate 42. In at least one embodiment, the main adaptor plate 42 is removeably connected to the valve housing 14. The main adaptor plate 42 has opposing first and second surfaces 44 and 46 and opposing ends 48 and 50. Main adaptor plate 42 defines at least one milling slot 47 substantially along the longitudinal axis extending between opposing ends 48 and 50 of the adaptor plate 42. Additionally, the main adaptor plate 42 defines a plurality of openings 52 spaced about the main adaptor plate 42. A crank engagement or nut 54 is illustrated extending outward from first surface 44 and positioned at end 50 and adapted to engage a cranking rod 80.

FIGS. 3-5 depict, the main adaptor plate 42 is approximately 34" long, 7½" wide and ¾" thick and defines the milling slot 47 as 13" wide and 3" wide. The main adaptor plate 42 defines 12 5/16 threaded openings 52 which do not extend through the main adaptor plate 42 (i.e., are less than ¾" deep). Further, the illustrated nut 52 is a ¾" ACME threaded nut that extends from the surface 44 and engages cranking rod 80. It should be appreciated that the above dimensions and arrangements are illustrative only, and different dimensions and arrangements are contemplated.

FIGS. 6-9 depict an embodiment of a horizontal sliding gate cutting adaptor 60 adapted to movably contact the main adapted plate 42 and slide along the longitudinal axis thereof. The sliding gate adaptor 60 has opposing first and second surfaces 62 and 64 and opposing ends 66 and 68. Sliding gate adaptor 60 defines at least one cutting hole 70 (in one embodiment adapted to be aligned with milling slot 47) substantially in the center between opposing ends 66 and 68 of the sliding gate adaptor 60. Additionally, the sliding gate cutting adaptor 60 defines a slot 72 as a cranking rod attachment at end 68 and has threaded portion 74 extending from surface 62. Further the sliding gate 60 includes a single or double tube gasket 76, 77 on either or both surfaces 62, 64, respectively, creating an air tight seal.

FIGS. 6-9 depict the sliding gate cutting adaptor 60 is approximately 24" long, 5" wide and ¾" thick and defines cutting hole 70 mateable with the working end of the mill as a round hole having a diameter greater than about 3" and adapted to receive the threaded portion 74 having a 3" inside threads which extends less than 2" from surface 62 (1¼" for example). Slot 72 is a push-pull adaptor slot adapted to receive the cranking rod 80. The gasket 76, 77 is defined as an oval have a longitudinal length of 20" and a width of about 4". It should be appreciated that the above dimensions and arrangements are illustrative only, and different dimensions and arrangements are contemplated.

Figure 10:
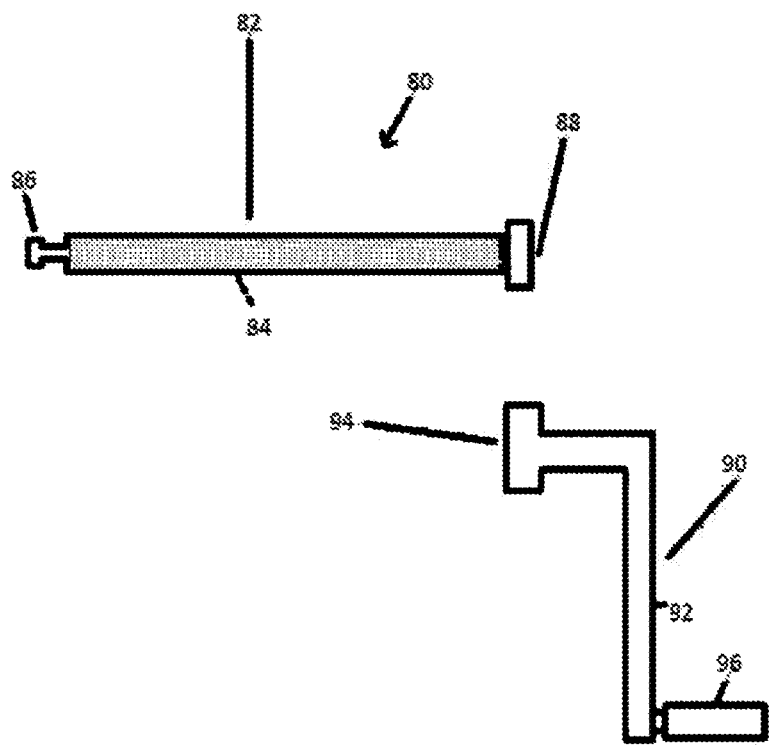
FIG. 10 is a view of a cranking rod used with the valve fitting milling system of FIGS. 1-2 in accordance with one embodiment of the present invention.

Turning back to FIGS. 1-2, the valve fitting milling system 10 includes a cranking rod 80 adapted to engage the sliding gate cutting adaptor 60 and the main adaptor plate 42, moving the sliding gate cutting adapter 60 with respect to the main adaptor plate 42. FIG. 10 depicts the cranking rod 80 having a crank shaft 82 and crank 90. Crank shaft 82 includes a stock 84 having a push-pull adaptor 86 adapted to engage push-pull adaptor slot 72 and an opposing nut 88. Crank 90 includes a shaft 92 having a socket 94 and a handle 96.

FIG. 10 illustrates that crank shaft 82 is a 12' ACME threaded stock and nut 88 is a ¾" nut. Further, socket 94 is a ¾" socket adapted to removable engage nut 88. It should be appreciated that the above dimensions and arrangements are illustrative only, and different dimensions and arrangements are contemplated.

Figure 11:
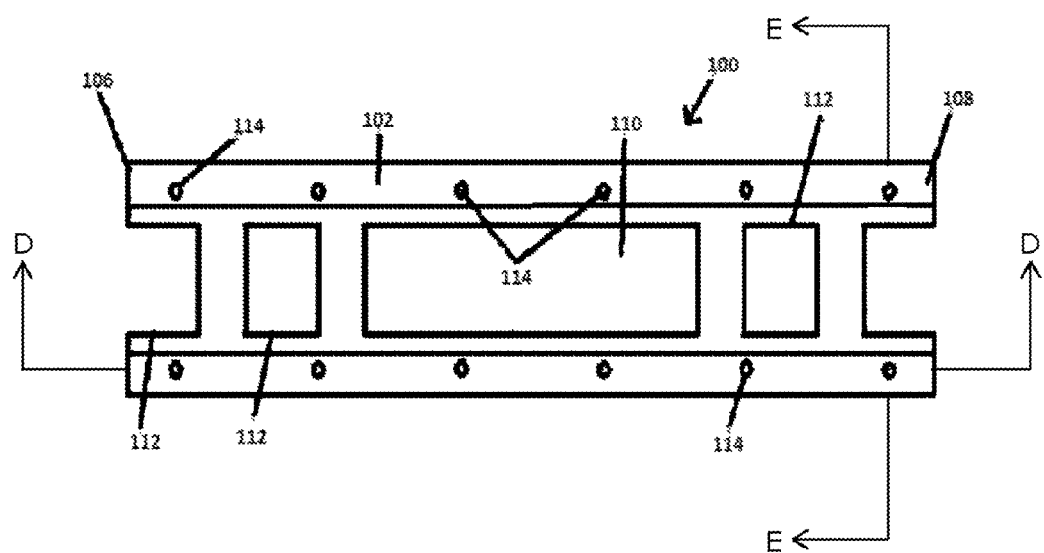
FIG. 11 is a top view of a top retainer track used with the valve fitting milling system of FIGS. 1-2 in accordance with one embodiment of the present invention.
Figure 12:
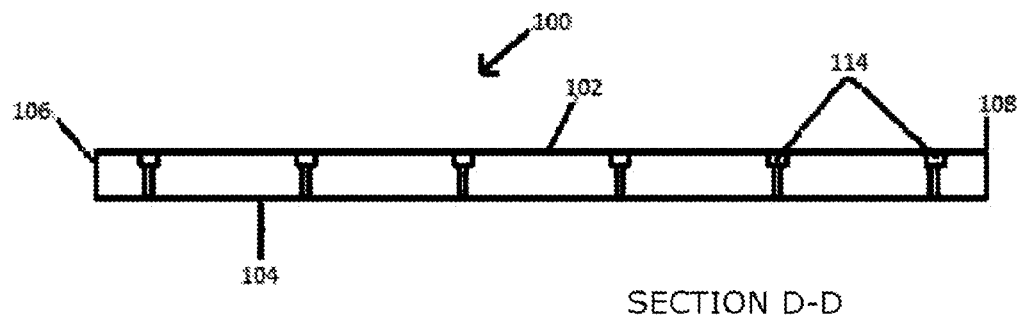
FIG. 12 is a side view of the top retainer track FIG. 11 in accordance with one embodiment of the present invention.
Figure 13:
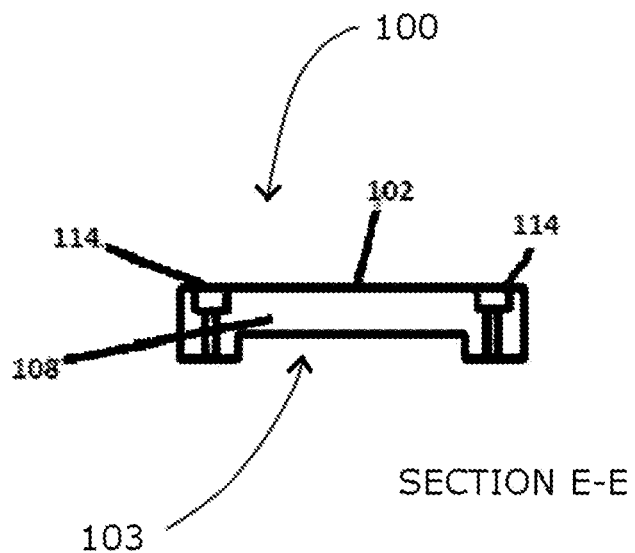
FIG. 13 is an end view of the top retainer track of FIG. 11 in accordance with one embodiment of the present invention.

The valve fitting milling system 10 further includes a top retainer track 100 adapted to be removable connected to at least the main adaptor plate 42; whereby a mill 120 is adapted to engage at least the sliding gate adaptor 60 and mill a hole in the pipe 12 to receive a valve therein. FIGS. 11-13 depict one embodiment of the top retainer track 100. The top retainer track 100 has opposing first and second surfaces 102 and 104 and opposing ends 106 and 108. Top retainer track 100 defines at least one clearance hole 110 (adapted to be aligned with at least one or both of the milling slot 47 and the cutting hole 70) substantially in the center between opposing ends 106 and 108 of the top retainer track adaptor 100. Additionally, the top retainer track 100 further defines one or more holes 112 and one or more bolt holes 114 which are adapted to align with bolt holes 52 of the main adaptor plate 42. The top retainer track 100 also defines, in conjunction with the main adapter plate, a slider passage 103 adapted to receive the sliding gate cutting adaptor.

FIGS. 11-13 depict the top retainer track 100 is approximately 34" long, 7½" wide and 1½" thick. Clearance hole 110 is defined as being 14" long and 4" wide, while one more of the holes 112 are 3" long and 4" wide and space 2" from the hole 110 and each other. The top retainer track 100 further defines bolt holes 114 extending there through, such that a bolt may be positioned flush in bolt hole 114 and engage the threaded openings 52 in the main adaptor plate 42 securing at least the top retainer track 100 and main adaptor plate 42.

Figure 14:
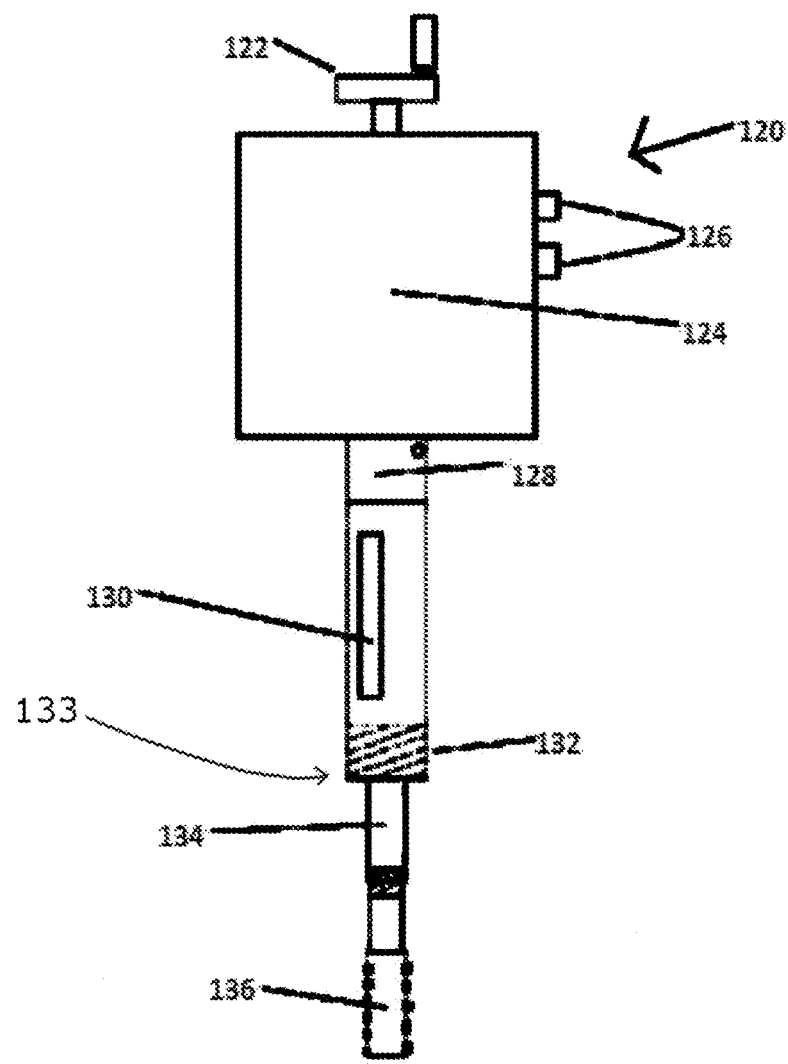
FIG. 14 is a side view of a horizontal end mill used with the valve fitting milling system of FIGS. 1-2 in accordance with one embodiment of the present invention.

FIG. 14 depicts an embodiment of a horizontal end mill 120 adapted to engage at least the sliding gate adaptor 60 and mill a hole in the pipe 12 to receive a valve therein. In at least one embodiment, horizontal end mill 120 is adapted to mile a hole or slot 11 in pipe 12 in a cross-cut fashion (i.e., in a directional substantially parallel to the longitudinal direction of the pipe 12 or between about 80° to about 100° degrees, but generally about 90° degrees to the longitudinal direction of the pipe 12 as illustrated by the arrows in FIG. 2).

As illustrated, mill 120 includes a depth crank 122 engaging drive mechanism or motor 124 having a power source 126. The mill 120 includes a seals and weep hole 128, a depth gauge 130, a thread 132, an extendable shaft 134 and a cutting bit 136 extendable from working end 133. In the embodiment illustrated in FIG. 14, thread 132 is a 3" pipe thread adapted to removeably engage threads 74 of the sliding gate cutting adaptor 60. Cutting bit 136 is a 6 fluted indexable cutting bit with is adapted to engage at least one or more of hole 114 in the top retainer track 100, cutting hole 70 in the sliding gate cutting adaptor 60 and the milling slot 47 using the depth crank 122 and determined by depth gauge 130.

Figure 15:
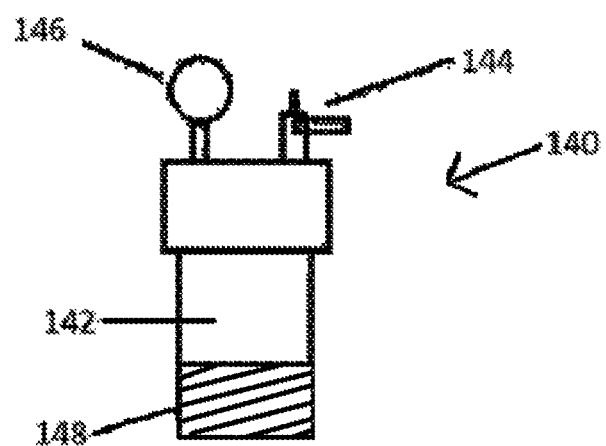
FIG. 15 is a side view of the pressure testing cap in accordance with one embodiment of the present invention.

FIG. 15 depicts a pressure testing cap 140 that can be used pressure test the seal in the valve fitting milling system 10 to verify the seal. As illustrated, the pressure testing cap 140 includes a body 142, and an air in source 144 and pressure gauge 146 in fluid communication with the body 142. In at least one embodiment, the pressure testing cap 140 has a threaded end 148. As illustrated, the pressure testing cap 140 is 6" high and 3" Wide.

Figure 16A:
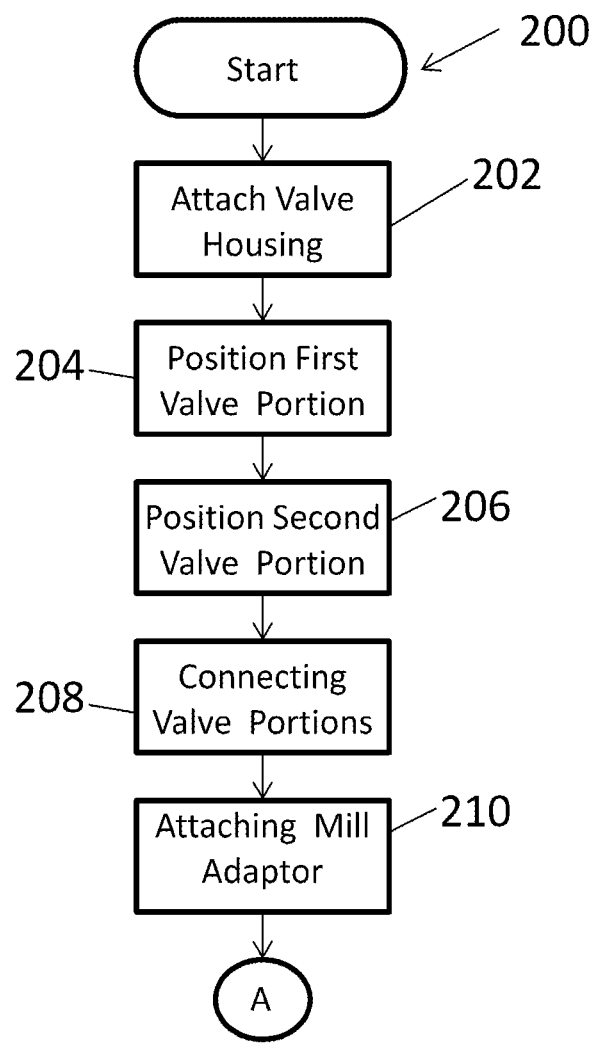
FIG. 16A-C is a flow chart illustrating one method for milling a transmission pipe.
Figure 16B:
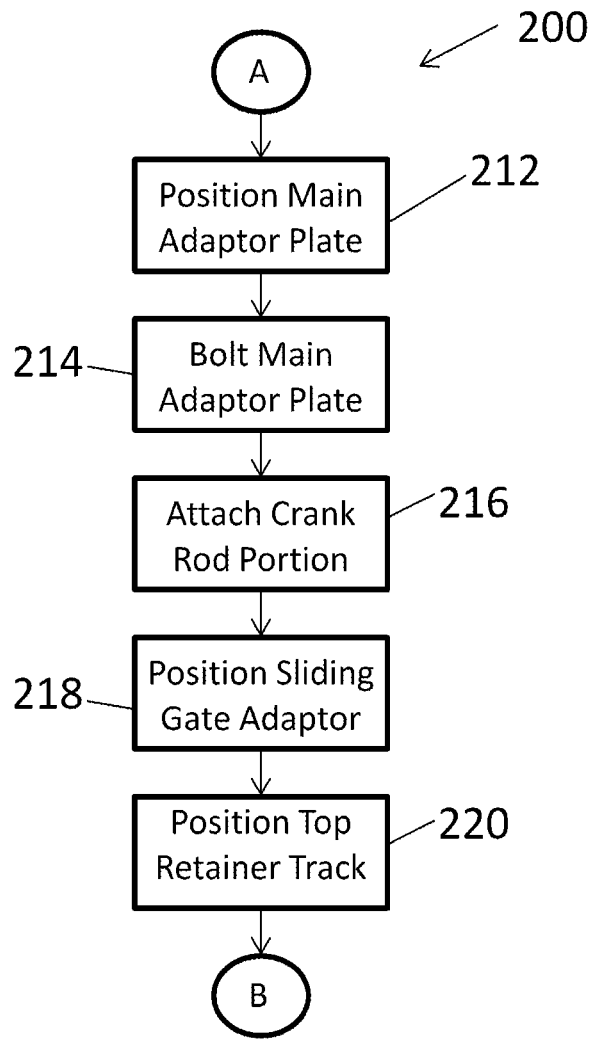
Figure 16C:
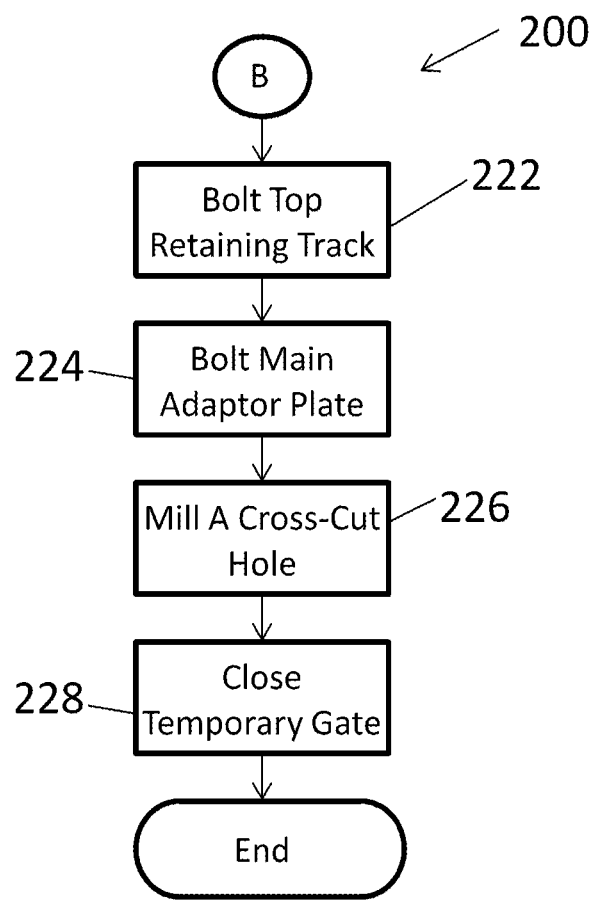

FIG. 16A-C depicts a flow chart illustrating a method 200 for milling a transmission pipe 12. Method 200 includes attaching a valve housing 14 having a temporary gate to the transmission pipe 12 extending about the outer circumference 13 of the transmission pipe 12 along a longitudinal axis the transmission pipe 12, block 202; and positioning a first valve portion 16 around a portion of an exterior surface 13 of the transmission pipe 12, block 204. The method 200 further includes positioning a second valve portion 20 around a portion of the exterior surface 13 of the transmission pipe 12, block 206; and connecting the first valve portion 16 to the second valve portion 20, block 208.

FIG. 16A-C further illustrates the method 200 includes attaching a milling adaptor 40 used with a mill 120 to at least the valve housing 14, block 210; which includes positioning a main adaptor plate 42 on the valve housing 14, the main adaptor plate 42 defining at least one milling slot 13, block 212; bolting the main adaptor plate 42 to the valve housing 14, block 214; and attaching a cranking rod 80 to at least the main adaptor plate 42, block 216.

Attaching the milling adaptor 40 of method 200 includes positioning a horizontal sliding gate cutting adaptor 60 on the main adaptor plate 40, the sliding gate cutting adaptor 60 is movably contacts the main adapted plate 42 and engaging the cranking rod 80, the sliding gate cutting adaptor 60 defining at least one cutting hole 70, block 218; and positioning a top retainer track 100 on the sliding gate adaptor plate 60, block 220; and bolting the top retainer track 100 to the main adaptor plate 40, block 222.

Method 200 further includes attaching a mill 120 to at least the milling adaptor 40, block 224; milling a cross cut hole 13 in the transmission pipe 12 along an axis dissimilar to the longitudinal axis of the transmission pipe, block 226; and closing the temporary gate, block 228.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A milling adaptor for use in milling a cross-cut slot in a pipe with a mill and a valve housing, the pipe having a longitudinal axis, the mill having a cutting bit extendable from a working end, the valve housing being positionable about the pipe, the milling adaptor comprising:

a main adaptor plate removeably connectable to the valve housing, the main adaptor plate defining a milling slot and having a crank engagement at an end of the main adaptor plate, the milling slot being substantially perpendicular to the longitudinal axis when the main adaptor plate is connected to the valve housing;

a sliding gate cutting adaptor slideably contactable with the main adaptor plate, the sliding gate cutting adaptor defining a cutting hole and having a cranking rod attachment at an end of the sliding gate cutting adaptor, the cutting hole being mateable with the working end of the mill;

a cranking rod removeably engagable with the crank engagement and the cranking rod attachment; and a top retainer track removeably connectable to the main adaptor plate, the top retainer track and the main adaptor plate defining a slider passage between the top retainer track and the main adaptor plate when the main adaptor plate is connected to the top retainer track;

wherein to mill the cross-cut slot when the main adaptor plate is connected to both the valve housing and the top retainer track with the sliding gate cutting adaptor disposed within the slider passage, and when the cranking rod is engaged with the crank engagement and the cranking rod receiver, rotation of the cranking rod in a first direction advances the cutting hole along the milling slot and rotation of the cranking rod in a second direction opposite the first direction retracts the cutting hole along the milling slot.

2. The milling adaptor of claim 1 further comprising a threaded portion removeably engageable between the working end and the cutting hole, the threaded portion being extendable through a hole defined in the top retainer track.

3. The milling adaptor of claim 1 wherein the crank engagement is a threaded nut and the cranking rod includes a threaded stock engageable with the threaded nut.

4. The milling adaptor of claim 1 wherein the sliding gate cutting adaptor further includes a gasket that engages the main adaptor plate when the main adaptor plate is connected to the top retainer track with the sliding gate cutting adaptor disposed within the slider passage.

5. The milling adaptor of claim 1 wherein the top retainer track adaptor further defines bolt holes, each of the bolt holes being adapted to removably receive a bolt recessed below a surface of the top retainer track.

6. The milling adaptor of claim 1 wherein the cranking rod attachment is a slot defined in the sliding gate cutting adaptor and the cranking rod includes a push-pull adaptor engageable with the slot.

7. The milling adaptor of claim 1 wherein the sliding gate cutting adaptor further includes a gasket that engages the top retainer track when the main adaptor plate is connected to the top retainer track with the sliding gate cutting adaptor disposed within the slider passage.

8. The milling adaptor of claim 1 wherein an internal volume of the milling adaptor including the cutting hole and the milling slot is sealed when the main adaptor plate is connected to both the valve housing and the top retainer track with the sliding gate cutting adaptor disposed within the slider passage and when the working end of the mill is mated with the cutting hole.

9. A system for milling a cross-cut slot in a pipe with a mill, the pipe having an outer circumference and a longitudinal axis, the mill having a cutting bit extendable from a working end, the system comprising:

a valve housing comprising:
 a first valve portion; and
 a second valve portion removably connectable to the first valve portion;

wherein, when the first valve portion is connected to the second valve portion, the valve housing encircles the outer circumference of the pipe along the longitudinal axis; and a milling adaptor comprising:
 a main adaptor plate removeably connectable to the valve housing, the main adaptor plate defining a milling slot and having a crank engagement at an end of the main adaptor plate, the milling slot being substantially perpendicular to the longitudinal axis when the main adaptor plate is connected to the valve housing;
 a sliding gate cutting adaptor slideably contactable with the main adaptor plate, the sliding gate cutting adaptor defining a cutting hole and having a cranking rod attachment at an end of the sliding gate cutting adaptor, the cutting hole being mateable with the working end of the mill;
 a cranking rod removeably engagable with the crank engagement and the cranking rod attachment; and
 a top retainer track removeably connectable to the main adaptor plate, the top retainer track and the main adaptor plate defining a slider passage between the top retainer track and the main adaptor plate when the main adaptor plate is connected to the top retainer track;
 wherein to mill the cross-cut slot when the main adaptor plate is connected to both the valve housing and the top retainer track with the sliding gate cutting adaptor disposed within the slider passage, and when the cranking rod is engaged with the crank engagement and the cranking rod receiver, rotation of the cranking rod in a first direction advances the cutting hole along the milling slot and rotation of the cranking rod in a second direction opposite the first direction retracts the cutting hole along the milling slot.

10. The milling system of claim 9 further comprising a threaded portion removeably engageable between the working end and the cutting hole, the threaded portion being extendable through a hole defined in the top retainer track.

11. The milling system of claim 9 wherein the cranking rod attachment is a slot defined in the sliding gate cutting adaptor and the cranking rod includes a push-pull adaptor engageable with the slot.

12. The milling system of claim 9 wherein the sliding gate cutting adaptor further includes a gasket that engages the main adaptor plate when the main adaptor plate is connected to the top retainer track with the sliding gate cutting adaptor disposed within the slider passage.

13. The milling system of claim 9 wherein the crank engagement is a threaded nut and the cranking rod includes a threaded stock engageable with the threaded nut.

14. The milling system of claim 9 wherein the top retainer track adaptor further defines bolt holes, each of the bolt holes being adapted to removably receive a bolt recessed below a surface of the top retainer track.

15. The milling system of claim 9 wherein the sliding gate cutting adaptor further includes a gasket that engages the top retainer track when the main adaptor plate is connected to the top retainer track with the sliding gate cutting adaptor disposed within the slider passage.

16. A method for milling a cross-cut slot in a transmission pipe with a mill, the pipe having an outer circumference and a longitudinal axis, the mill having a cutting bit extendable from a working end, the method comprising:

attaching a valve housing to the transmission pipe, the valve housing encircling the outer circumference of the transmission pipe along the longitudinal axis;

attaching a milling adaptor to the valve housing, the milling adaptor having a milling slot substantially perpendicular to the longitudinal axis fixed relative to the transmission pipe, and the milling adaptor having a cutting hole moveable along the milling slot;

attaching the working end of the mill to the cutting hole of the milling adaptor;

rotating the cutting bit;

extending the cutting bit through the cutting hole to contact the transmission pipe; and translating the cutting hole along the milling slot to cut the cross-cut slot in the transmission pipe.

17. The method of claim 16 wherein the attaching the valve housing to the transmission pipe comprises:

positioning a first valve portion around a first portion of an exterior surface of the transmission pipe;

positioning a second valve portion around a second portion of the exterior portion of the transmission pipe; and connecting the first valve portion to the second valve portion.

18. The method of claim 16 wherein the attaching the milling adaptor to the valve housing comprises:

positioning a main adaptor plate with respect to the valve housing, the main adaptor plate defining the milling slot;

bolting the main adaptor plate to the valve housing;

attaching a cranking rod to the main adaptor plate;

positioning a sliding gate cutting adaptor on the main adaptor plate, the sliding gate cutting adaptor movably contacting the main adaptor plate and engaging the cranking rod, the sliding gate cutting adaptor defining the cutting hole;

positioning a top retainer track on the sliding gate adaptor plate with the sliding gate cutting adaptor slideably disposed in a slider passage defined between the top retainer track and the main adaptor plate; and bolting the top retainer track to the main adaptor plate.

19. The method of claim 16 wherein:

the rotating the cutting bit comprises rotating the cutting bit with a drive mechanism of the mill; and the extending the cutting bit comprises extending the cutting bit with a depth control device adapted to control depth of the cutting bit in the milling adaptor.

20. The method of claim 16 wherein milling slot lies at an angle between about 80° and about 100° to the longitudinal axis of the transmission pipe.

* * * * *